(12) United States Patent
Lee

(10) Patent No.: US 7,684,690 B2
(45) Date of Patent: Mar. 23, 2010

(54) METHOD AND SYSTEM FOR AUTOMATIC EXPOSURE COMPENSATION

(75) Inventor: Yueh-Ju Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 525 days.

(21) Appl. No.: 11/759,301

(22) Filed: Jun. 7, 2007

(65) Prior Publication Data
US 2007/0286592 A1     Dec. 13, 2007

(30) Foreign Application Priority Data
Jun. 9, 2006     (TW) .............................. 95120612 A

(51) Int. Cl.
G03B 7/00     (2006.01)
G03B 7/083     (2006.01)
H04N 5/235     (2006.01)

(52) U.S. Cl. ...................... 396/213; 396/247; 348/362

(58) Field of Classification Search ................. 396/213, 396/215, 246, 247, 250; 348/362–366
See application file for complete search history.

(56) References Cited

U.S. PATENT DOCUMENTS
4,422,747 A * 12/1983 Uchidoi et al. .............. 396/250

* cited by examiner

Primary Examiner—W. B. Perkey
Assistant Examiner—Minh Q Phan
(74) Attorney, Agent, or Firm—Thomas, Kayden, Horstemeyer & Risley

(57) ABSTRACT

A method for automatic exposure compensation is disclosed. A shutter is activated and the environmental brightness is detected using a sensor. An exposure value is calculated according to the detection result to obtain a default exposure time. It is determined whether the exposure value is equal to a normal value. If not, a compensation value is calculated based on a shutter-closing curve and a compensation operation is thus executed. Thus, an exposure signal is generated by advancing a first predefined time or postponing a second predefined time, enabling the amount of exposure time to be equal to the addition or subtraction of the default exposure time and the first predefined time.

20 Claims, 6 Drawing Sheets

METHOD AND SYSTEM FOR AUTOMATIC EXPOSURE COMPENSATION

BACKGROUND OF THE INVENTION

1. Field of the Invention

The invention relates to an extraction apparatus for digital images, and more particularly to a method and system for automatic exposure compensation applied to an extraction apparatus for digital images.

2. Description of the Related Art

Overexposure may occur when taking photographs in a highly bright environment where exposure time is far less than time required by a shutter to close.

Current automatic exposure methods of digital cameras determine the time required by a shutter to close based on an exposure equation, represented as:

$$EV=AV+TV=BV+LV,$$

where EV indicates an exposure value, AV indicates an aperture value, TV indicates a shutter value (speed), BV indicates a brightness value, and VL indicates a light value. When LV=15, for example, AV=5 and TV=10 can be assigned for exposure.

When the maximum shutter speed of the time required for a machine shutter to close is 1/500 seconds, for example, the exposure result is calculated by LV=15>5 (F5.6)+9 ($1/2^9$ seconds≈1/500 seconds)=14=1 EV, thus overexposure by 1 EV is detected.

The invention thus provides a method for automatic exposure compensation, applicable to an extraction apparatus for digital images, enabling accurate exposure when shutter speed is inadequate.

BRIEF SUMMARY OF THE INVENTION

Methods for automatic exposure compensation are provided. An exemplary embodiment of a method for automatic exposure compensation comprises the following. A shutter is activated and the environmental brightness is detected using a sensor. An exposure value is calculated according to the detection result to obtain a default exposure time. It is determined whether the exposure value is equal to a normal value. If not, a compensation value is calculated based on a shutter-closing curve and a compensation operation is accordingly executed. Thus, an exposure signal is generated by advancing a first predefined time or postponing a second predefined time, enabling the amount of exposure time to be equal to the addition or subtraction of the default exposure time and the first predefined time.

Systems for automatic exposure compensation are provided. An exemplary embodiment of a system for automatic exposure compensation comprises a memory unit, an aperture actuation system, a sensitization unit, a signal processing unit, and a sensitization component actuation system. The signal processing unit further comprises an operation unit and a determination unit. The aperture actuation system activates a shutter. The sensitization unit detects the environmental brightness. The operation unit calculates an exposure value according to the detection result to obtain a default exposure time. The determination unit determines whether the exposure value is equal to a normal value. If not, the operation unit calculates a compensation value based on a shutter-closing curve. The sensitization component actuation system executes a compensation operation and generates an exposure signal by advancing a first predefined time or postponing a second predefined time, enabling the amount of exposure time to be equal to the addition or subtraction of the default exposure time and the first predefined time.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
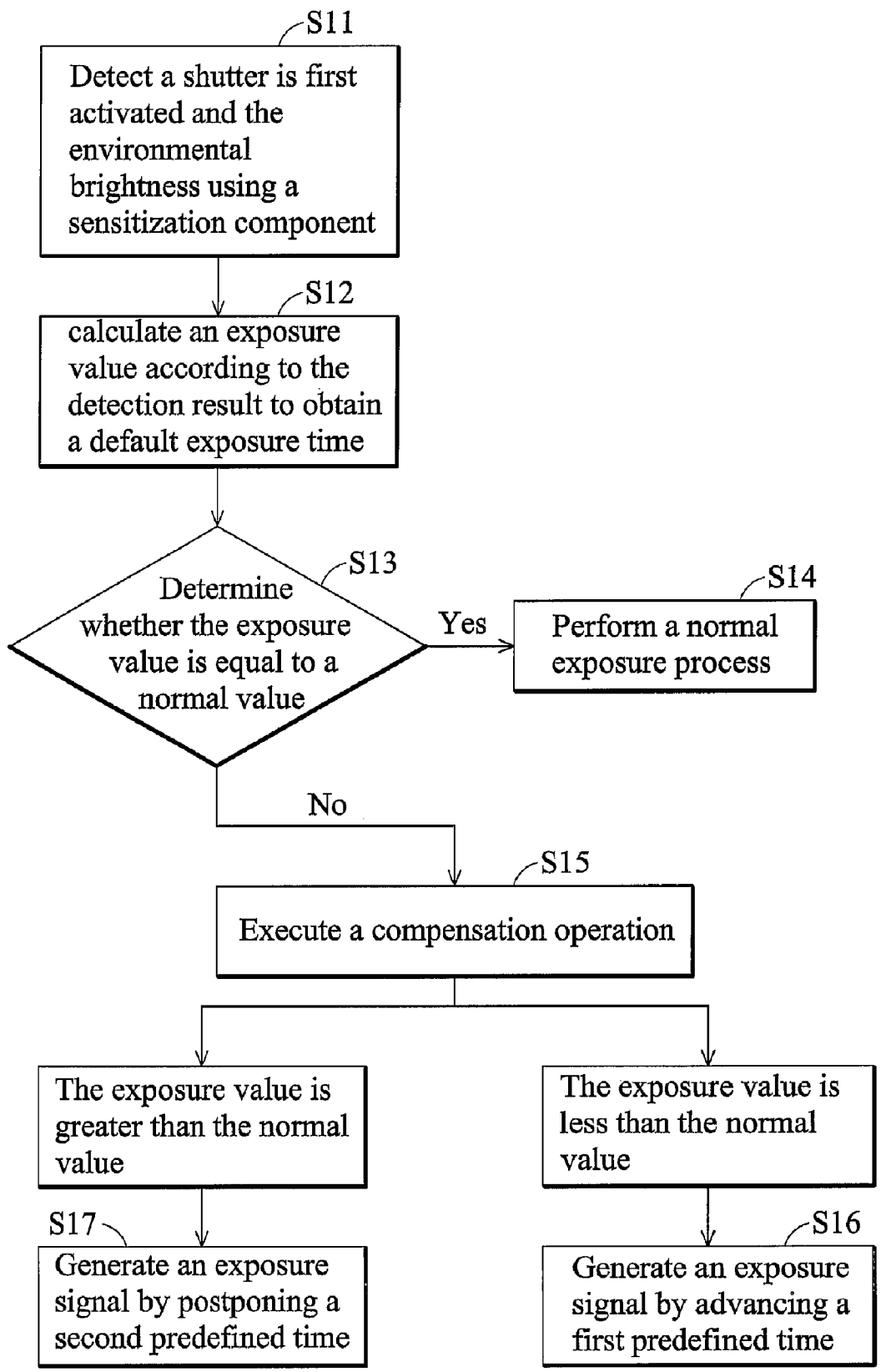
FIG. 1 is a flowchart of an embodiment of a method for automatic exposure compensation.

Several exemplary embodiments of the invention are described with reference to FIGS. 1 through 6, which generally relate to automatic exposure compensation. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for automatic exposure compensation applied to an extraction apparatus for digital images.

An embodiment of a method for automatic exposure compensation determines exposure time and the time required by a shutter to close according to environmental brightness detected by a charge coupled device (CCD). When the exposure value is greater than the shutter value, the start time of generating an exposure signal (CCD_CLEAR) must be postponed to shorten the exposure time. Alternatively, when the exposure value is less than the shutter value, the start time of generating an exposure signal (CCD_CLEAR) must be advanced to extend the exposure time.

FIG. 1 is a flowchart of an embodiment of a method for automatic exposure compensation.

A shutter is first activated and the environmental brightness is detected using a sensitization component (step S11). An exposure value is calculated according to the detection result to obtain a default exposure time (step S12). It is determined whether the exposure value is equal to a normal value (step S13). If the exposure value is equal to the normal value, a normal exposure process is performed (step S14). If the exposure value is not equal to the normal value, a compensation value is calculated based on a shutter-closing curve and a compensation operation is thus executed (step S15). If the exposure value is less than the normal value, an exposure signal is generated by advancing a first predefined time, enabling the amount of exposure time to be equal to the addition of the default exposure time to the first predefined time (step S16). If the exposure value is greater than the normal value, an exposure signal is generated by postponing a second predefined time, enabling the amount of exposure time to be equal to the subtraction of the default exposure time from the first predefined time (step S17). The first and second predefined times can be obtained by experiment.

It is noted that the described process is an exemplary example but is not intended to be limitative. The method can first determine whether the exposure value is equal to the normal value, for example, and, if not, perform the normal exposure process, and, if so, calculate the default exposure time and execute a corresponding compensation operation.

Figure 2:
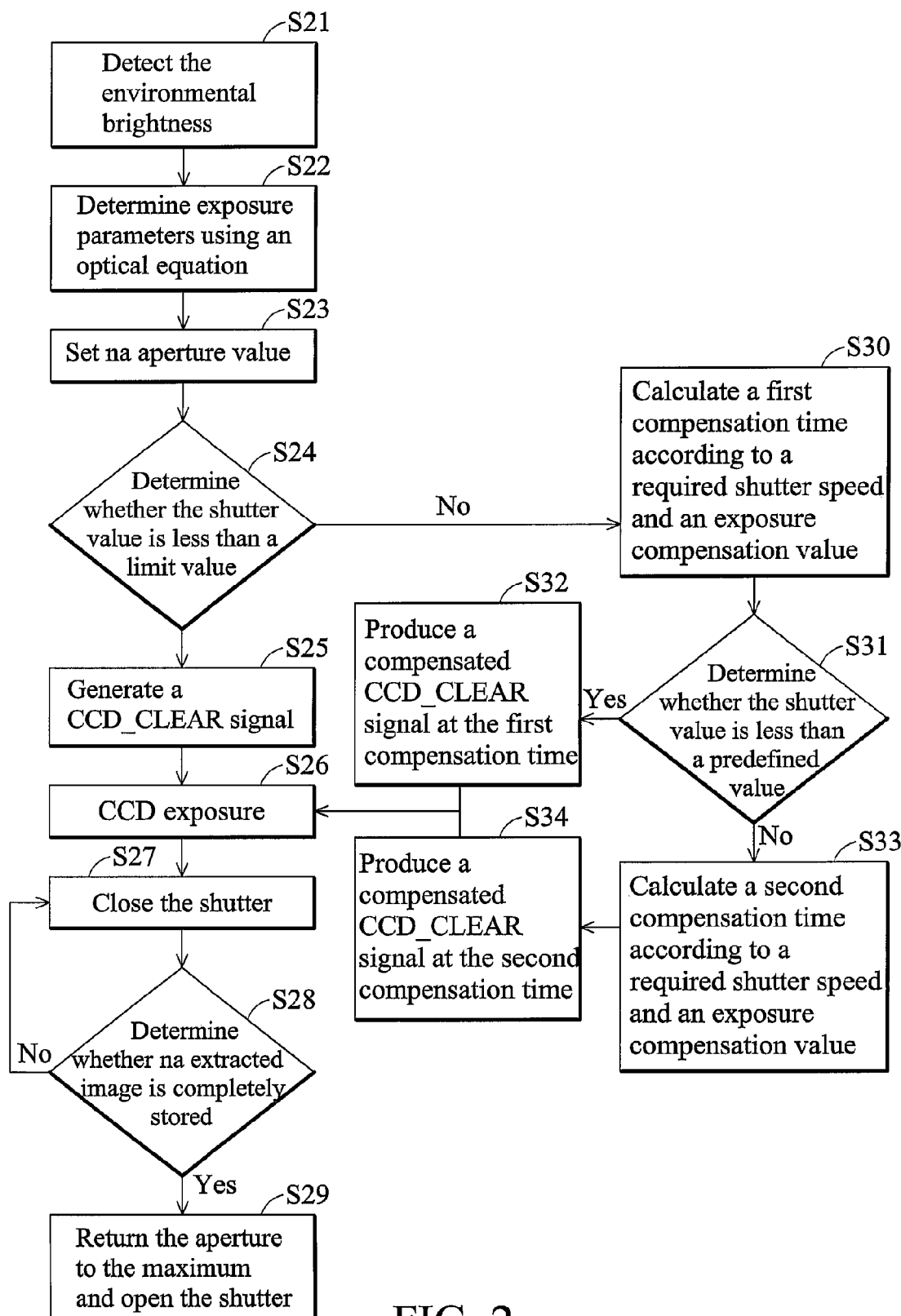
FIG. 2 is a flowchart of an embodiment of a method for automatic exposure compensation while underexposure is detected.

FIG. 2 is a flowchart of an embodiment of a method for automatic exposure compensation while underexposure is detected.

The environmental brightness is first detected using a sensitization component (a charge coupled device (CCD), for example) (step S21). A light value (LV) and an exposure value (EV) are calculated according to the detection result and corresponding exposure parameters, comprising an aperture value (AV) and a shutter speed (TV), are determined using an optical equation (step S22). The aperture value, such as 3 (F2.8), 4 (F4), or 5 (F5.6), is set according to the light value (step S23). Next, it is determined whether the shutter value is less than a limit value of the shutter (10(1/1000 sec), for example) (step S24), indicating whether the shutter speed is less than the limit value. If the shutter value is less than the limit value, the underexposure is not detected. A CCD_CLEAR signal is then generated according to required exposure time (step S25), CCD exposure begins (step S26) to extract an image, and the shutter is closed to complete the exposure (step S27). It is then determined whether the extracted image is completely stored (step S28), and, if so, the aperture value is returned to the maximum and the shutter is opened (step S29).

If the shutter value is greater than the limit value, indicating the shutter value is greater than the limit value at which the underexposure is detected, a first compensation time is calculated according to a required shutter speed (TV) and a calculated exposure compensation value (step S30). In this embodiment, the assigned shutter value is, but is not limited to, 1 to 14. If the assigned shutter value is 11, a compensation time ($\Delta T1$) can be obtained (IF TV=11, SHIFT=$\Delta T1$). If the assigned shutter value is assigned, another compensation time ($\Delta T2$) can be obtained (IF TV=12, SHIFT=$\Delta T2$). If the assigned shutter value is 13, another compensation time ($\Delta T3$) can be obtained (IF TV=13, SHIFT=$\Delta T3$). If the assigned shutter value is 14, another compensation time ($\Delta T4$) can be obtained (IF TV=14, SHIFT=$\Delta T4$).

Next, it is determined whether the shutter value is much less than a predefined value (13, for example) (step S31). The step determines whether the exposure time is greater than the shutter value. If the shutter value is much less than the predefined value, a compensated CCD_CLEAR signal ($\Delta T\_CCD\_CLEAR$) is generated according to a required exposure time and experimental and statistical values and is produced at the first compensation time (step S32) to enable the CCD exposure. Next, an image is extracted, the shutter is closed, the extracted image is stored, the aperture value is returned to the maximum, and the shutter is opened (step S26~S29). If the shutter value is not much less than the predefined value, a second compensation time is calculated according to a required shutter speed (TV) and a re-calculated exposure compensation value (step S33). A compensated CCD_CLEAR signal ($\Delta T\_CCD\_CLEAR$) is generated according to the required exposure time and experimental and statistical values and is produced at the second compensation time to enable CCD exposure (step S34), and the process proceeds to step S26. Next, an image is extracted, the shutter is closed, the extracted image is stored, the aperture value is returned to the maximum, and the shutter is opened (step S26~S29).

If an assigned shutter value is less than the predefined value, for example, the shutter value can also be assigned to the predefined value, and a compensated CCD_CLEAR signal ($\Delta T\_CCD\_CLEAR$) is generated according to required exposure time and experimental and statistical values to begin exposure and extract an image.

Additionally, with respect to the difference between the automatic exposure compensation detecting underexposure and not detecting underexposure, when underexposure can be detected, the exposure signal (CCD_CLEAR) is forward generated to increase the exposure. Alternatively, when overexposure can be detected, the exposure signal (CCD_CLEAR) is backward generated to reduce the exposure. Both described conditions are implemented by similar processes, and thus are not further described.

Figure 3:
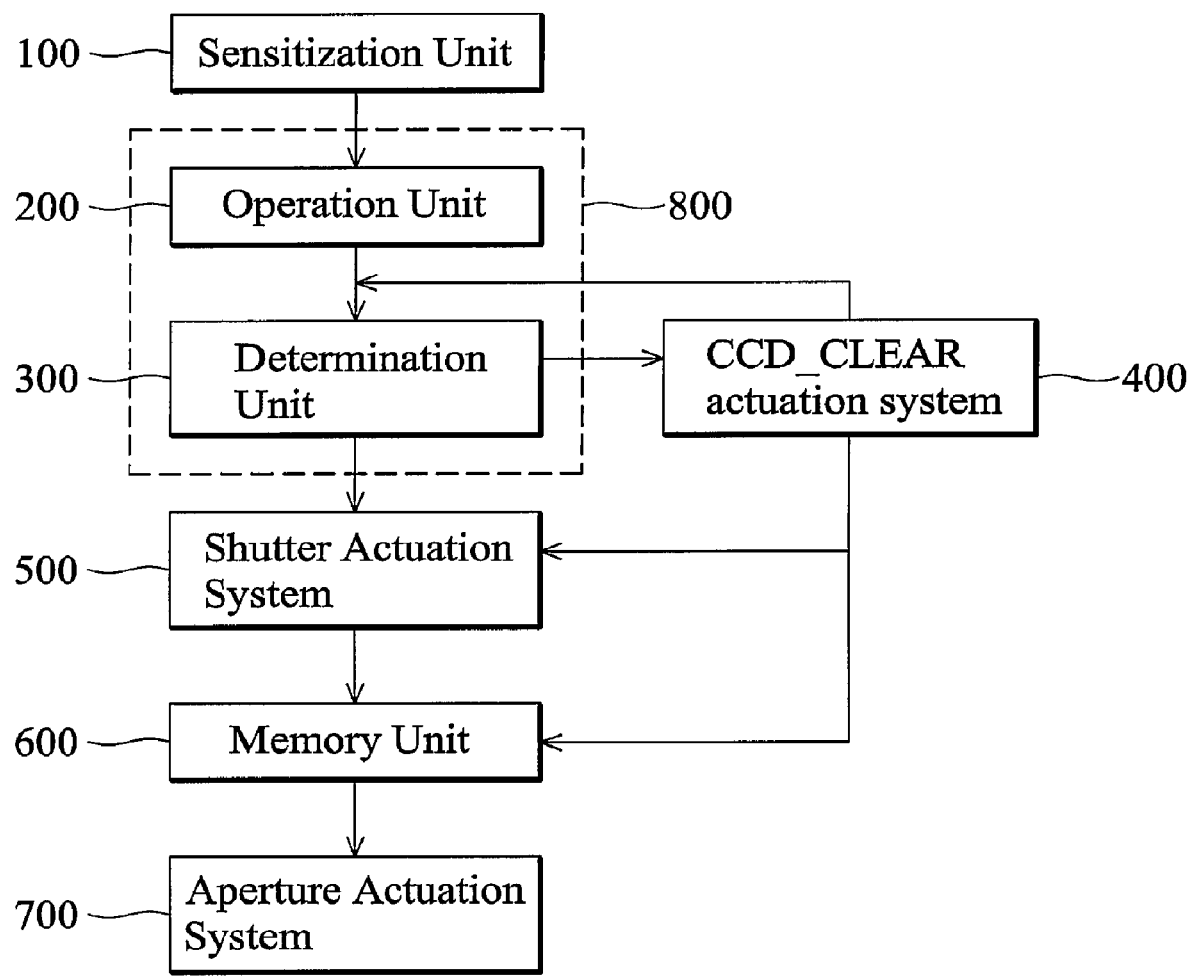
FIG. 3 is a schematic view of an embodiment of a system for automatic exposure compensation.

FIG. 3 is a schematic view of an embodiment of a system for automatic exposure compensation.

An embodiment of a system for automatic exposure compensation comprises a sensitization unit 100, an operation unit 200, a determination unit 300, a sensitization component (CCD_CLEAR) actuation system 400, a shutter actuation system 500, a memory unit 600, and an aperture actuation system 700. Operation unit 200 and determination unit 300 can be integrated to a signal processing unit 800.

Sensitization unit 100 first detects environmental brightness. Operation unit 200 calculates a light value (LV) and an exposure value (EV) according to the detection result, determines corresponding exposure parameters, comprising an aperture value (AV) and a shutter speed (TV), using an optical equation, and sets the aperture value according to the light value. Determination unit 300 determines whether the shutter value is less than a limit value (10(1/1000 sec), for example), indicating whether the shutter speed is less than the limit value. If the shutter value is less than the predefined value, indicating underexposure is not detected, CCD_CLEAR actuation system 400 generates a CCD_CLEAR signal according to required exposure time and pre-built data (experimental and statistical values) stored in memory unit 600 to begin exposure. When the exposure is complete, shutter actuation system 500 closes the shutter. Memory unit 600 then determines whether an extracted image is completely stored. If the extracted image is completely stored, aperture actuation system 700 returns the aperture value to the maximum, and shutter actuation system 500 opens the shutter.

If the shutter value is greater than the predefined value (the limit value), indicating the shutter value is greater than the limit value at which underexposure may be detected, operation unit 200 obtains an exposure value according to the detection result by sensitization unit 100 and determines whether underexposure is detected. If underexposure is detected, operation unit 200 calculates a first compensation time according to a required shutter speed (TV) and a calculated exposure compensation value. In this embodiment, the assigned shutter value is 1 to 14, but is not limited to this. If the assigned shutter value is 11, the CCD_CLEAR signal is shifted with a first offset ($\Delta T1$) (IF TV=11, SHIFT=$\Delta T1$). If the assigned shutter value is 12, the CCD_CLEAR signal is shifted with a second offset (ΔT2) (IF TV=12, SHIFT=ΔT2). If the assigned shutter value is 13, the CCD_CLEAR signal is shifted with a third offset (ΔT3) (IF TV=13, SHIFT=ΔT3). If the assigned shutter value is 14, the CCD_CLEAR signal is shifted with a fourth offset (ΔT4) (IF TV=14, SHIFT=ΔT4).

Next, memory unit 600 determines whether the shutter value is less than a predefined value (13, for example), indicating whether the exposure time is less than the shutter value. If the shutter value is less than the predefined value, CCD_CLEAR actuation system 400 generates a compensated CCD_CLEAR signal (ΔT_CCD_CLEAR) according to required exposure time and pre-built data (experimental and statistical values) stored in memory unit 600 and produces the CCD_CLEAR signal at the first compensation time to begin exposure, and shutter actuation system 500 closes the shutter to complete the exposure. Memory unit 600 then stores an extracted image, aperture actuation system 700 returns the aperture value to the maximum, and shutter actuation system 500 opens the shutter. If the shutter value is not less than the predefined value, operation unit 200 calculates a second compensation time according to a required shutter speed (TV) and a re-calculated exposure compensation value, and CCD_CLEAR actuation system 400 produces the CCD_CLEAR signal at the second compensation time to begin CCD exposure. Shutter actuation system 500 first closes the shutter, and CCD_CLEAR actuation system 400 generates a compensated CCD_CLEAR signal (ΔT_CCD_CLEAR) according to required exposure time and pre-built data (experimental and statistical values) stored in memory unit 600 to begin exposure. Memory unit 600 then stores an extracted image, aperture actuation system 700 returns the aperture value to the maximum, and shutter actuation system 500 opens the shutter.

Figure 4:
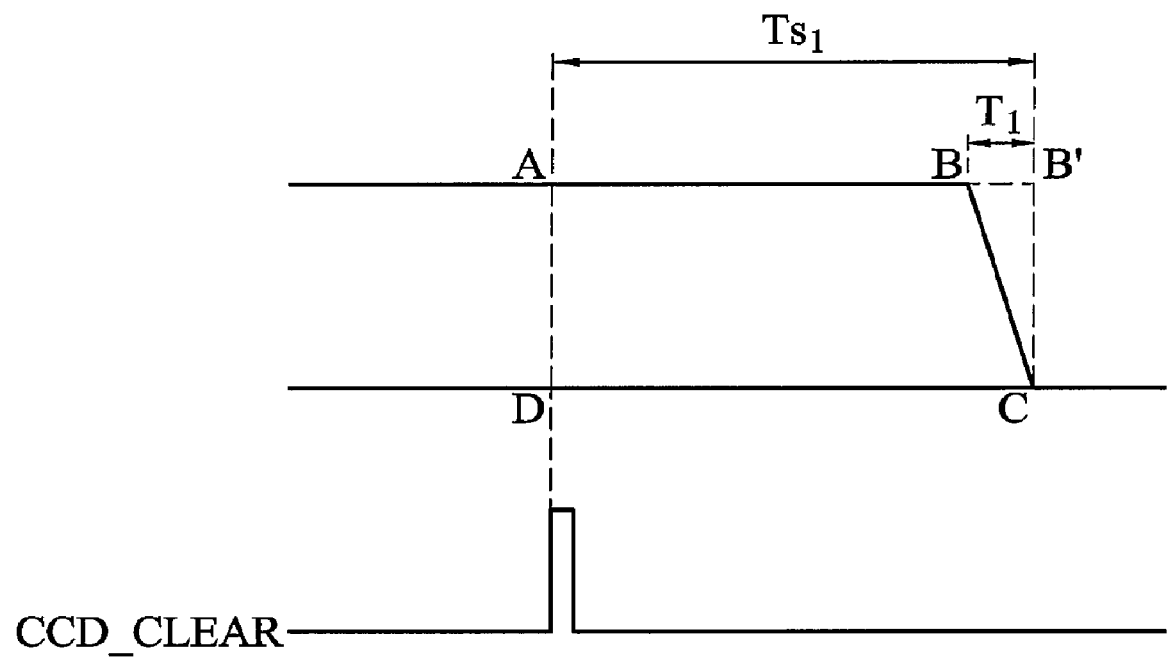
FIG. 4 illustrates a first example of automatic exposure compensation, in which the exposure time is far greater than the time required for a machine shutter to close.

FIG. 4 illustrates a first example of automatic exposure compensation, in which the exposure time is far greater than the close time of the time required for a machine shutter to close.

FIG. 4 shows a shutter-closing curve, in which line segment $\overline{AB'}$ represents an original exposure time (Ts$_1$), line segment $\overline{BB'}$ represents the close time (T$_1$) of the time required for a machine shutter to close, □AB'CD represents the correct exposure square measure, $\triangle$ABCD represents the real exposure square measure, and ΔBB'C represents the underexposure square measure. When the exposure time (Ts$_1$) is far greater than the close time (T$_1$) of the machine shutter (Ts$_1$>>T$_1$), because the underexposure square measure ΔBB'C is too small relating to the correct exposure square measure □AB'CD, the shutter speed does not effect the exposure value.

The generation time of the CCD_CLEAR signal is further described in the following. As described, EV=AV+TV, when the shutter is triggered, a microcontroller of the image extraction device calculates the required exposure time according to the preset exposure value and shutter value, and the exposure time (the generation time of the CCD_CLEAR signal) is forward calculated according to the close time of the shutter.

Figure 5A:
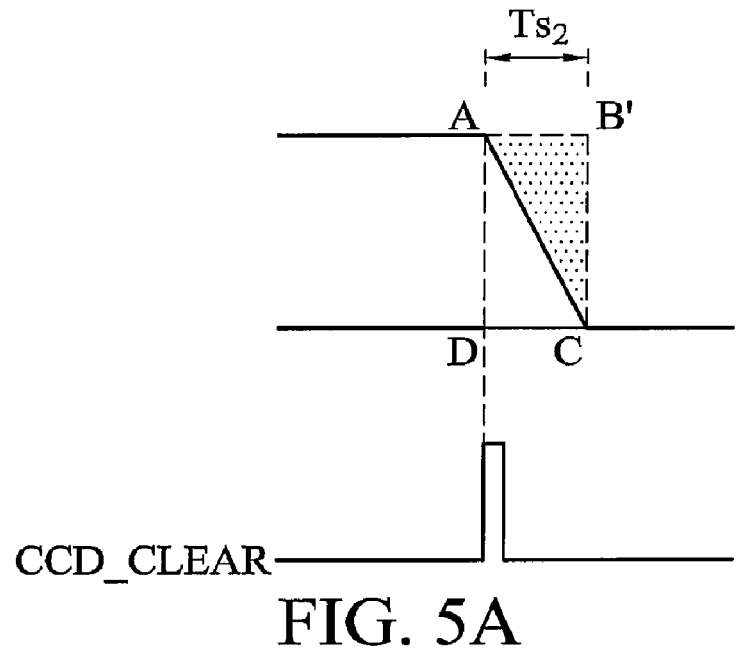
FIGS. 5A and 5B illustrate a second example of automatic exposure compensation, in which the exposure time is equal the time required for the machine shutter to close.
Figure 5B:
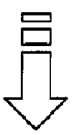
Figure 5B:
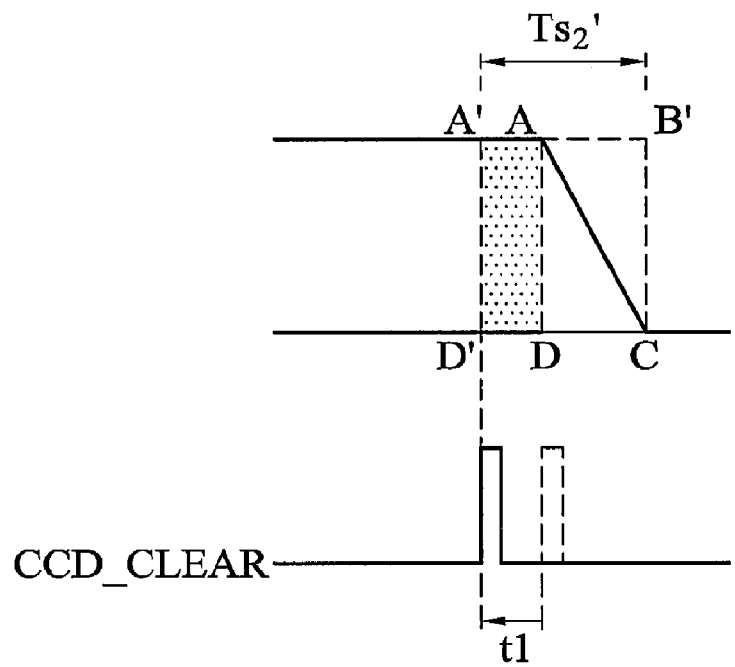

FIGS. 5A and 5B illustrate a second example of automatic exposure compensation, in which the exposure time is equal the time required for the machine shutter to close.

FIG. 5A shows a shutter-closing curve, in which line segment $\overline{AB'}$ represents an original exposure time (Ts$_2$), line segment $\overline{AB'}$ also represents the close time (T$_2$) of the machine shutter, □AB'CD represents the correct exposure square measure, ΔACD represents the real exposure square measure, and ΔAB'C represents the underexposure square measure. When the exposure time (Ts$_2$) is equal to the close time (T$_2$) of the machine shutter (Ts$_2$>>T$_2$), underexposure occurs because the real exposure square measure ΔACD is only a half of the correct exposure square measure □AB'CD, such that the second example of automatic exposure compensation is performed.

Referring to FIG. 5B, the size of the exposure square measure equal to the underexposure square measureΔAB'C is implemented prior to the line segment $\overline{AD}$ for exposure compensation. Thus, the CCD_CLEAR signal is generated by advancing time t1 to accomplish square measure transfer, such that the exposure square measure □AB'CD can be equal to the exposure square measure $\triangle$A'ACD'. After exposure compensation is implemented, line segment $\overline{A'B'}$ represents the compensated exposure time (Ts$_2$'), which is equal to the original exposure time (Ts$_2$) adding the time t1 (Ts$_2$'=Ts$_2$+t1), such that exposure time is extended to Ts$_2$', achieving correct exposure.

Figure 6A:
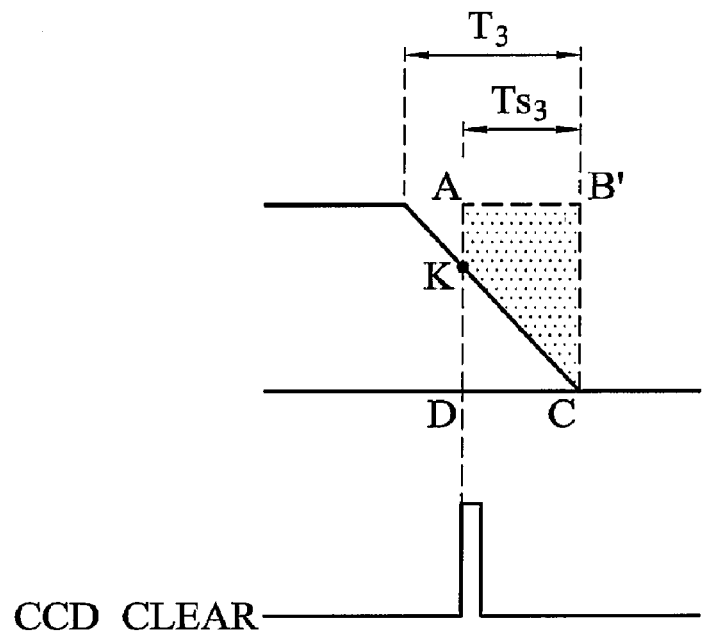
FIGS. 6A and 6B illustrate a third example of automatic exposure compensation, in which the exposure time is far less than the close time of the time required for a machine shutter to close.
Figure 6B:
Figure 6B:
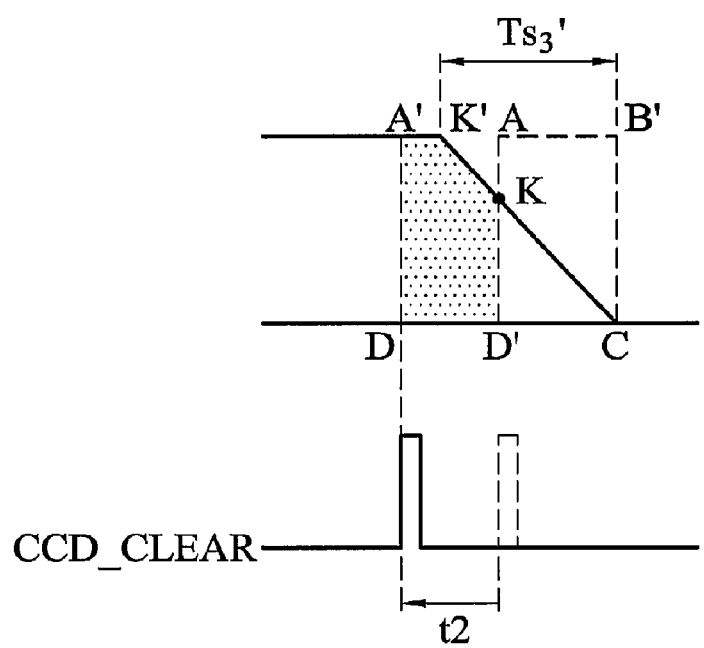

FIGS. 6A and 6B illustrate a third example of automatic exposure compensation, in which the exposure time is far less than the time required for a machine shutter to close.

FIG. 6A shows a shutter-closing curve, in which line segment $\overline{AB'}$ represents an original exposure time (Ts$_3$), line segment $\overline{AB'}$ also represents the close time (T$_3$) of the machine shutter, □AB'CD represents the correct exposure square measure, ˆKCD represents the real exposure square measure, and $\triangle$AB'CK represents the underexposure square measure.

When the exposure time (Ts$_3$) is far less than the close time (T$_3$) of the machine shutter (Ts$_3$<<T$_3$), serious underexposure occurs because the real exposure square measureΔKCD is only the very small part of the correct exposure square measure □AB'CD, such that the third example of automatic exposure compensation is performed.

Referring to FIG. 6B, the size of square measure equal to the underexposure square measure ◇ AB'CK is implemented prior to the line segment $\overline{AD}$ for exposure compensation. Thus, the CCD_CLEAR signal is generated by advancing time t2 to accomplish square measure transfer, such that the exposure square measure □AB'CD can be equal to the exposure square measure $\triangle$A'K'CD'. After exposure compensation is implemented, line segment $\overline{A'B'}$ represents the compensated exposure time (Ts$_3$'), which is equal to the original exposure time (Ts$_3$) adding the time t2 (Ts$_3$'=Ts$_3$+t2), such that exposure time is extended to Ts$_3$', achieving correct exposure.

Generally, if the shutter speed reaches the limit value in the highly bright environment, the ISO value of camera settings or the aperture value may be reduced to obtain appropriate exposure results. Color saturation is, however, reduced and the scene depth is extended resulting in back focus shift, and blurriness. Thus, an embodiment of a method and system for automatic exposure compensation retains the original scene depth and ISO value to achieve optimal shutter operation.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for automatic exposure compensation, comprising:
   activating a shutter and detecting environmental brightness using a sensor;
   calculating an exposure value according to the detection result to obtain a default exposure time;
   determining whether the exposure value is equal to a normal value;
   if the exposure value is greater than the normal value, calculating a first compensation value based on a shutter-closing curve; and
   generating an exposure signal by postponing a first predefined time according to the first compensation value, enabling the amount of exposure time to be equal to the subtraction of default exposure time from the first predefined time.

2. The method for automatic exposure compensation as claimed in claim 1, further comprising obtaining the first compensation value by experiment.

3. The method for automatic exposure compensation as claimed in claim 1, further comprising:
   if the exposure value is less than the normal value, reducing the closing speed of the shutter; and
   extracting and storing an image.

4. The method for automatic exposure compensation as claimed in claim 3, further comprising:
   calculating a second compensation value based on the shutter-closing curve and the closing speed;
   generating the exposure signal by postponing a second predefined time according to the second compensation value for exposure; and
   extracting and storing the image.

5. The method for automatic exposure compensation as claimed in claim 1, wherein the determination step further comprises:
   setting an aperture parameter according to the exposure value;
   setting a shutter parameter according to the aperture parameters; and
   determining whether the shutter parameter is less than a predefined value.

6. The method for automatic exposure compensation as claimed in claim 5, further comprising:
   if the shutter parameter is less than the predefined value, assigning the predefined value to the shutter parameter;
   calculating a third compensation value based on the shutter-closing curve and the shutter parameter;
   generating the exposure signal by postponing a third predefined time according to the third compensation value for exposure; and
   extracting and storing the image.

7. The method for automatic exposure compensation as claimed in claim 5, further comprising setting an aperture value according to the exposure value.

8. The method for automatic exposure compensation as claimed in claim 5, further comprising setting a shutter speed according to the aperture parameter.

9. The method for automatic exposure compensation as claimed in claim 5, wherein the predefined value is a limit value corresponding to the shutter parameter.

10. A system for automatic exposure compensation, comprising:
    a shutter actuation system, activating a shutter;
    a memory unit;
    an aperture actuation system;
    a sensitization unit, detecting environmental brightness;
    a signal processing unit, calculating an exposure value according to the detection result to obtain a default exposure time, determining whether the exposure value is equal to a normal value, and, if the exposure value is greater than the normal value, calculating a first compensation value based on a shutter-closing curve; and
    a sensitization component actuation system, generating an exposure signal by postponing a first predefined time according to the first compensation value enabling the amount of exposure time to be equal to the subtraction of default exposure time from the first predefined time.

11. The system for automatic exposure compensation as claimed in claim 10, wherein the signal processing unit reduces the closing speed of the shutter if the exposure value is less than the normal value.

12. The system for automatic exposure compensation as claimed in claim 11, wherein the signal processing unit calculates a second compensation value based on the shutter-closing curve and the closing speed and generates the exposure signal by postponing a second predefined time according to the second compensation value, and the sensitization component actuation system implements exposure according to the second predefined time.

13. The system for automatic exposure compensation as claimed in claim 12, wherein the first compensation value and the second compensation value is built into the memory unit.

14. The system for automatic exposure compensation as claimed in claim 10, wherein the signal processing unit further sets an aperture parameter according to the exposure value, sets a shutter parameter according to the aperture parameters, and determines whether the shutter parameter is less than a predefined value.

15. The system for automatic exposure compensation as claimed in claim 14, wherein the signal processing unit further assigns the predefined value to the shutter parameter if the shutter parameter is less than the predefined value and calculates a third compensation value based on the shutter-closing curve and the shutter parameter and the memory stores extracted an image.

16. The system for automatic exposure compensation as claimed in claim 15, wherein the third compensation value is built into the memory unit.

17. The system for automatic exposure compensation as claimed in claim 14, wherein the signal processing unit further sets an aperture value according to the exposure value.

18. The system for automatic exposure compensation as claimed in claim 14, wherein the signal processing unit further sets a shutter speed according to the aperture parameter.

19. The system for automatic exposure compensation as claimed in claim 14, wherein the predefined value is a limit value corresponding to the shutter parameter.

20. The system for automatic exposure compensation as claimed in claim 10, wherein the signal processing unit further comprises:
   an operation unit, calculating an exposure value according to the detection result to obtain the default exposure time; and
   a determination unit, determines whether the exposure value is equal to the normal value.

* * * * *